(12) United States Patent
Ng et al.

(10) Patent No.: US 7,836,179 B2
(45) Date of Patent: Nov. 16, 2010

(54) CONTENT VALIDATION FOR DIGITAL NETWORK

(75) Inventors: Sheau Ng, Wayland, MA (US); Bill Mandel, Moorpark, CA (US); Glenn Arthur Reitmeier, Yardley, PA (US)

(73) Assignee: NBC Universal, Inc., New York, NY (US)

( * ) Notice: Subject to any disclaimer, the term of this patent is extended or adjusted under 35 U.S.C. 154(b) by 516 days.

(21) Appl. No.: 11/469,627

(22) Filed: Sep. 1, 2006

(65) Prior Publication Data

US 2008/0059609 A1 Mar. 6, 2008

(51) Int. Cl.
*G06F 15/173* (2006.01)
*G06F 15/16* (2006.01)
*H04L 9/32* (2006.01)

(52) U.S. Cl. .................. 709/225; 709/229; 713/176
(58) Field of Classification Search ............... 709/246, 709/220, 225; 713/176
See application file for complete search history.

(56) References Cited

U.S. PATENT DOCUMENTS

| 5,940,135 | A | 8/1999 | Petrovic et al. |
| 6,430,301 | B1 | 8/2002 | Petrovic |
| 6,507,299 | B1 | 1/2003 | Nuijten |
| 6,737,957 | B1 | 5/2004 | Petrovic et al. |
| 7,046,808 | B1 | 5/2006 | Metois et al. |
| 7,426,750 | B2 * | 9/2008 | Cooper et al. ............ 726/26 |
| 2004/0107356 | A1 | 6/2004 | Shamoon et al. |
| 2007/0079130 | A1 * | 4/2007 | Vandewater et al. ...... 713/176 |

FOREIGN PATENT DOCUMENTS

| WO | WO02/39713 A2 | 5/2002 |
| WO | WO 03034408 A | 4/2003 |
| WO | WO 03083627 A | 10/2003 |
| WO | WO 03098931 A | 11/2003 |
| WO | WO2004/111752 A2 | 12/2004 |
| WO | WO2005/043358 A1 | 5/2005 |
| WO | WO 2006051043 A | 5/2006 |

OTHER PUBLICATIONS

Limewire 4.9.4 beta, Author: Jorge Gonzalez, Published: Jul. 18, 2005 http://www.zeropaid.com/news/5567/limewire_494_beta_/.*
SDMI Secure Digital Music Initiative, title: SDMI Portable Device Specification, Jul. 8, 1999, pp. 1-35, Version 1.0, Part 1, PDWG, Los Angeles, XP000997330.

* cited by examiner

*Primary Examiner*—Benjamin R Bruckart
*Assistant Examiner*—Noel Beharry
(74) *Attorney, Agent, or Firm*—GE Global Patent Operation; Roger C. Phillips; William Fitzpatrick

(57) ABSTRACT

A method of validating content for use on at least one node of a network, includes identifying whether the content has at least one adjunct; reviewing the at least one adjunct, where found, to determine whether the content is valid for use on the at least one node; and indicating that the content is unauthorized for use on the at least one node where no adjunct is found and/or where an adjunct is found that is not able to render the content valid for use on the at least one node.

17 Claims, 4 Drawing Sheets

CONTENT VALIDATION FOR DIGITAL NETWORK

BACKGROUND OF THE INVENTION

1. Field of the Invention

The subject matter described herein relates generally to networks and, more particularly, to the validation of content entering a node.

2. Related Art

Various methods and devices are currently available for adding and/or modifying an adjunct to digital data content. For example, International Publication No. WO 2005/043358 describes recording content distribution information into authorized copies of content by modifying an adjunct to content with content distribution information. This is accomplished using a functional transformation each time an authorized copy of the content is generated. By modifying the adjunct to content, a trail of content distribution information is stored in the adjunct that is extractable from the adjunct in any of such generated copies by sequentially performing an inverse transformation on the adjunct until information of an original copy is detected.

In another example, U.S. Pat. No. 6,507,299 to Nuijten describes an arrangement for embedding supplemental data such as a watermark in an information signal. The arrangement involves a conventional sigma-delta modulator for encoding an audio signal and modifying means for periodically replacing a bit of the encoded signal by a bit of the watermark. In the same manner, a sync pattern is embedded in the signal. The sync bits are embedded at a smaller distance than the watermark bits. The sync pattern is a pattern of contiguous bits that is not typically generated by the encoder. For the sigma-delta modulator, such a pattern is a run of ones followed by a substantially equally long run of zeroes, or vice versa.

Also, adjuncts to digital data content may be added to authenticate data on a computer. International Publication No. WO 2004/111752 describes a method for providing authentication data and data authentication software to an electronic device that is stored in a secure storage location inaccessible to the user or operating system of the device. When digital data is requested from a transaction party that requests a digital signature, the authentication software is activated to generate the digital signature and embeds the digital signature in the digital data. Digital data digitally signed may only be accessed if the embedded digital signature is identical to a regenerated digital signature that is regenerated by the authentication software, using user inaccessible authentication data installed on the device. If the embedded and regenerated digital signatures are not identical, the data may not be accessed and an error signal is generated.

However, to date, no suitable device or method is available for validating digital data content entering a node of a network.

BRIEF DESCRIPTION OF THE INVENTION

In accordance with an embodiment of the present invention, a method of validating content for use on at least one node of a network comprises identifying whether the content comprises at least one adjunct; reviewing the at least one adjunct, where found, to determine whether the content is valid for use on the at least one node; and indicating that the content is unauthorized for use on the at least one node where no adjunct is found and/or where an adjunct is found that is not able to render the content valid for use on the at least one node.

In accordance with another aspect of the present invention, a circuit for validating content entering at least one node of a network comprises a display, a memory and means for identifying whether the content comprises an adjunct. The identifying means also being configured to indicate whether the content is unauthorized for use on a node where no adjunct is found and/or where an adjunct is found that is not able to render the content valid for entry to the at least one node. The identifying means being interconnected with the display and the memory.

BRIEF DESCRIPTION OF THE DRAWINGS

The following detailed description is made with reference to the accompanying drawings, in which.

DETAILED DESCRIPTION OF THE PREFERRED EMBODIMENT

One embodiment of the present invention concerns a method and a device for validating content such as digital data entering a node of a network. The content is reviewed to determine whether an adjunct is present and, where present, whether it provides a sufficient basis for validating the content for use on the node and throughout the network.

As used herein, the term adjunct refers to something that is associated with the content but not an underlying work. Adjuncts commonly contain information about the content and/or rights associated with the content. Examples of adjuncts include meta data included in a carrier containing rights associated with the content such as in a digital rights management (DRM) wrapper, a watermark that is added or embedded in the content, or a signature such as a digital signature or a message that is related to the content, added to, joined with, or otherwise associated to the content.

As used herein the term content refers to any data compilation such as audio and/or video data, for example comprising a film composition, a musical composition, a game, etc.

As used herein the term watermark refers to any information embedded in a content that concerns the content but is separable from the work of the content. The watermark may be in a video format and/or an audio format and the watermark(s) may be visible, such as the NBC PEACOCK logo visible on a display during playback, and/or on that is invisible during playback. Likewise, the watermark(s) may be audible and/or inaudible during playback. A watermark may also contain information as to prior transferor(s) that the content was transferred from.

Figure 3:
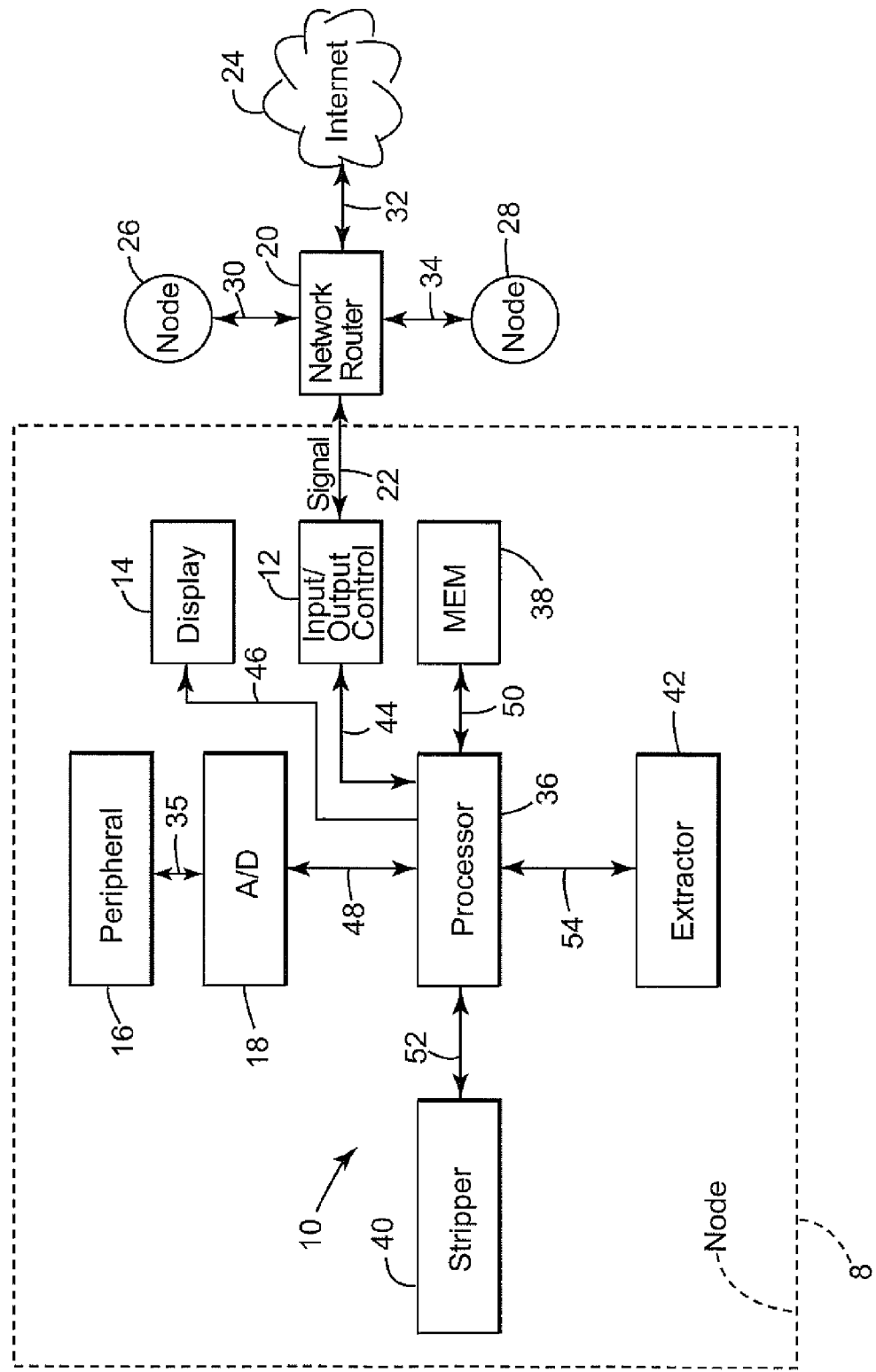
FIG. 3 is a block diagram of a circuit for validating content on a network in accordance with the embodiment of FIG. 1.

Referring now to FIG. 3, a circuit for validating content in accordance with one embodiment of the present invention is illustrated generally at 10. In this embodiment, the circuit 10 is located at a node 8 and comprises an input/output control 12, a display 14, at least one peripheral 16, and an analog to digital converter 18. The input/output control 12 is any known device that is capable of providing communication between the node 8 and a network router 20 (also a known device) via a wired or wireless path 22. The network router 20 is also interposed in a known manner between the Internet 24 and additional nodes 26 and 28 via wired or wireless paths 30, 32 and 34. It will be understood that while two additional nodes are shown, any number of nodes are contemplated in optional embodiments of the present invention. The display 14, the peripheral 16, e.g., a compact disk (CD) or a digital versatile disk (DVD) drive and the analog to digital converter 18 are also well known devices. The peripheral 16 may comprise multiple CD and/or DVD drives or other known or future developed devices and communicates with the analog to digital converter via a wired or wireless connection 35.

In accordance with this embodiment, the circuit 10 also comprises a processor 36 and associated memory 38, a stripper 40 and an extractor 42. Although not described herein, it will be understood that in an optional embodiment, the processor 36 may also be configured to provide the below described function of the stripper 40 and/or the extractor 42 via, e.g., additional software.

Also, in accordance with this embodiment, the processor 36 is connected to each of the input/output control 12, the display 14, the analog to digital converter 18 and the memory 38 via paths 44, 46, 48 and 50. The processor 36 comprises, e.g., a known integrated circuit capable of numerous calculations per second and is configured to process, as described in more detail below, content received from the peripheral 16 and/or input/output control 12. The processor 36 is configured to provide an indication as to whether the content is valid for entry to the node 8, such as for viewing on the display 14, and, where not valid, to provide a message to the other nodes 26 and 28.

The stripper 40 communicates with the processor 36 via a path 52 and similar to the processor 36 comprises, in one embodiment, an integrated circuit that is configured to receive the content from the processor and determine whether the content comprises meta data such as a digital rights management (DRM) wrapper. A DRM wrapper may provide copy control information indicating whether the content may be copied and/or how many times it may be copied.

Where a DRM wrapper is determined to be present in the content, the stripper 40 then strips and reads the data to determine whether there are sufficient rights granted for use on the node 8. This may be accomplished by the steps described below. Additional details of a process for validating rights available in a DRM wrapper is available in PCT Publication No. WO 2005/043358, incorporated herein by reference only to the extent necessary to make and practice the present invention.

In another embodiment, the stripper 40 may comprise a special-purpose high-speed Digital Signal Processor (DSP) or general-purpose processor including embedded processor logic such as ARM or MIPS based architecture.

The extractor 42 communicates with the processor 36 via a path 54 and also similar to the processor 36 comprises, in one embodiment, an integrated circuit that is configured to receive the content from the processor and determine whether the content has information such as a watermark embedded therein. As described above, the content may include video and/or audio watermarks that are visible and/or invisible and audible and/or inaudible during playback.

If a watermark is determined to be present, the extractor 42 extracts the watermark and reads the watermark to determine what information is provided. For example, the watermark may assert that there must be rights associated with the content that bears the particular watermark, the watermark may specify usage restrictions such as that the content is "not for home use" or the watermark may identify the source of the content and/or any previous transferors of the watermark. This may be accomplished in functional steps as described below.

In another embodiment, the extractor 42 may comprise circuit components used in an audio Digital Signal Processor (DSP) such as that described in U.S. Pat. Nos. 5,940,135, 6,430,301, 6,737,957 and 7,046,808 assigned to the Verance Corporation also incorporated herein by reference to the extent necessary to make and use the present invention.

Figure 1:
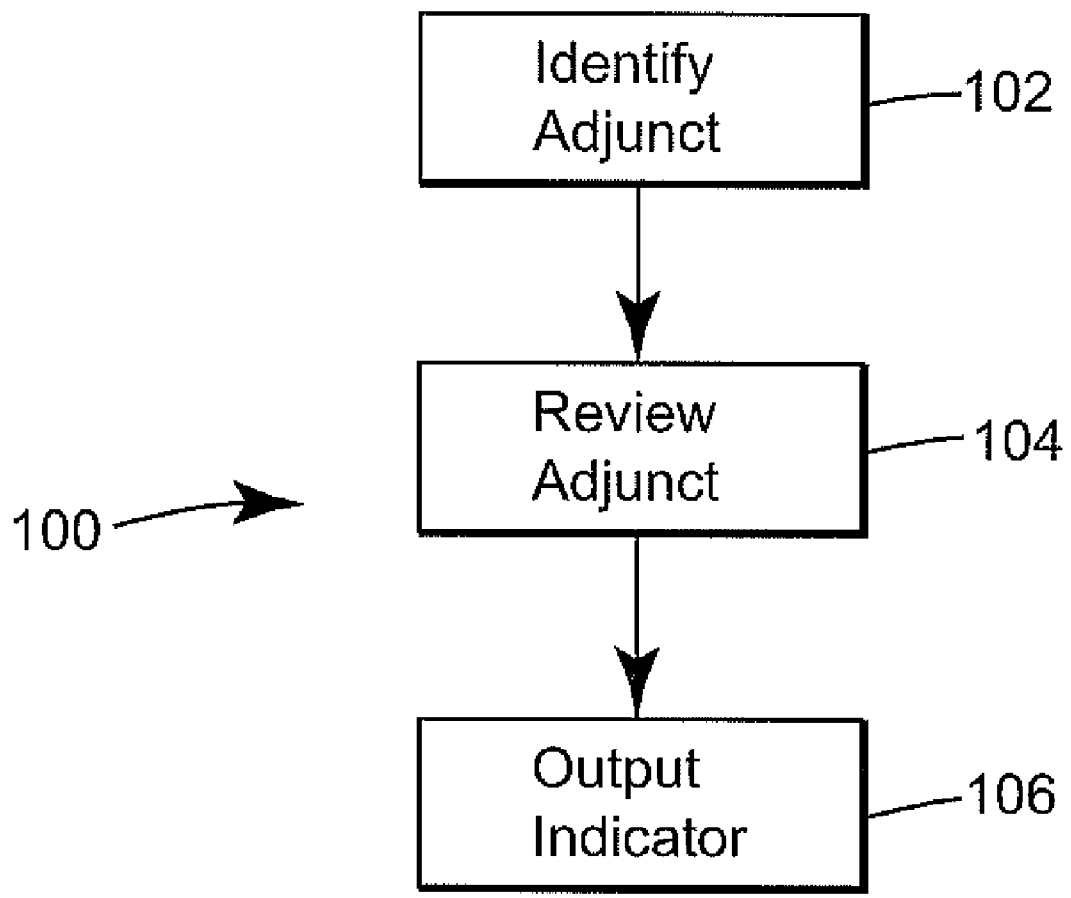
FIG. 1 is a flow diagram showing a method of validating content on a network in accordance with an embodiment of the present invention.

Referring now to FIG. 1, a method of validating content in accordance with an embodiment of the present invention is illustrated generally at 100. In this embodiment, the method 100 comprises identifying whether the content comprises at least one adjunct at 102. Thereafter, reviewing the at least one adjunct, where found, to determine whether the content is valid at 104 for entry to a node and, then, outputting an indication that the content is unauthorized for use on the node where either no adjunct is found or where the content is not determined to be valid 106.

Figure 2:
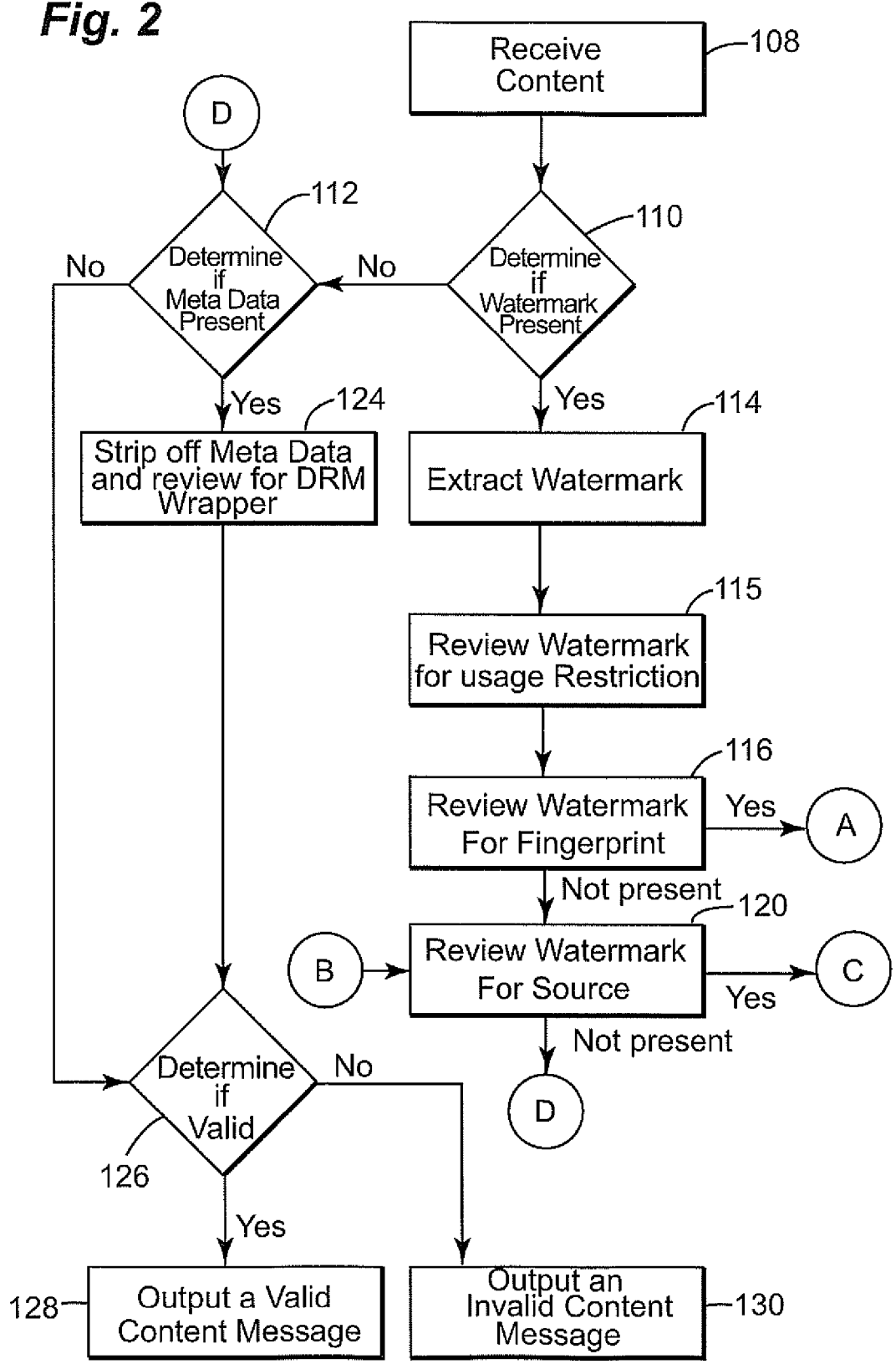
FIG. 2 is a flow diagram showing further details of the method of FIG. 1.

Further details of the method of this embodiment of FIG. 1 are shown in FIG. 2. As shown, digital data content is first received at 108 and then may be reviewed for whether a watermark is present at 110. Where a watermark is found not to be present, in this embodiment, it is next questioned whether meta data, such as a DRM wrapper is present at 112, as described further below. While not illustrated herein, it will be appreciated that the order of determining whether a watermark is present or whether meta data is present may be accomplished in either order or contemporaneously. Also, it will be apparent that the order of many of the additional steps described below may be interchanged or accomplished contemporaneously.

Figure 4:
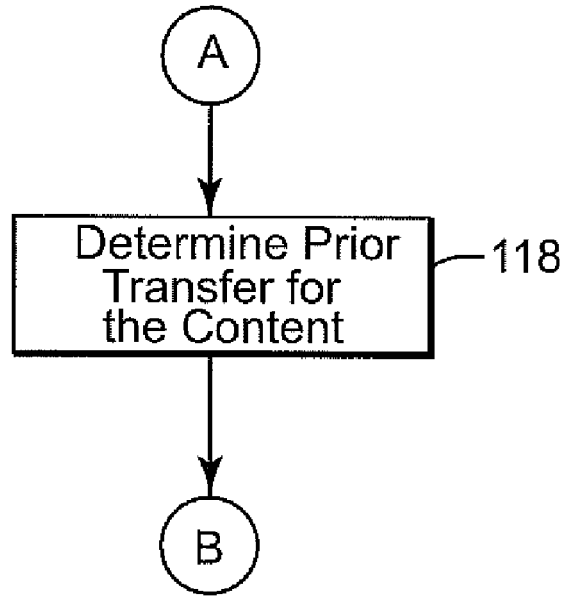
FIG. 4 is a flow diagram showing further details of the method of FIG. 1.
Figure 5:
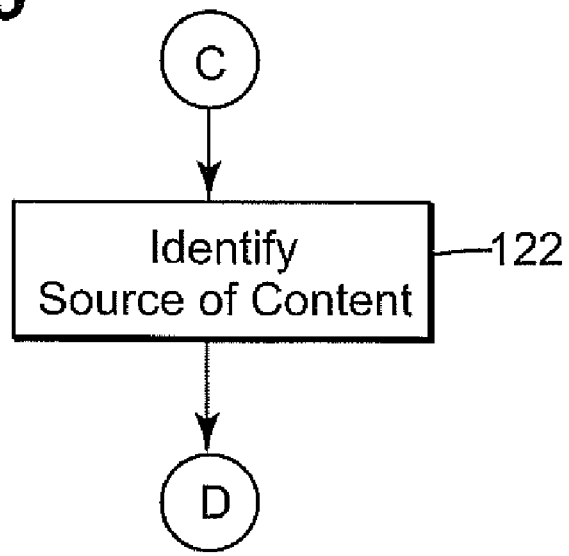
FIG. 5 is a flow diagram showing further details of the method of FIG. 1.

In the event that a watermark is found to be present in the content, then it is next extracted at 114 and then it may be reviewed for usage restrictions at 115. Next, the watermark may be reviewed for a "fingerprint" or an indication of one or more prior transferor's information at 116. Thereafter, if available, as shown in FIG. 4, the prior transferor(s) are identified at 118. Once the prior transferors are identified or no fingerprint is identified, the watermark may be reviewed for an indication of the source of the underlying work at 120 and, if available, the source is identified at 122 as illustrated in FIG. 5.

Thereafter, and not having previously determined if metadata is present at 112, it is determined whether metadata is present and where available the metadata is reviewed at 124 for a DRM wrapper. Next, a decision function is carried out to take the information stripped and extracted from the adjunct and make a flexible determination whether the content is valid for entry to the node 8 at 126. For example, it may be determined whether the rights granted are sufficient to allow use of the content by the node 8, whether the usage restrictions given can be met through use on the node, or whether a transferor is identified and compared with the rights granted in the DRM. Other decisions include restriction on storage of the content, duplication of the content, and transcoding including format conversion of the content. A restriction is typically a time-related restriction, such as one that renders the content valid for a particular duration of time.

Where the content is determined to be valid at 126 for one or more particular processing procedures (such as storage, duplication, decoding, transcoding/format conversion, or rendition thereof), a proper signal will be sent with the content to display 14 by the processor 36 that there is valid content for entry to the node 8 at 128. Similarly, signals are also sent to the other nodes 26 and 28. Otherwise, a signal is sent to the display that the content is invalid and the other network nodes are notified that the content is invalid at 130, and a proper signal indicating the content status of invalidity is attached to the content.

In the present embodiment, the processor may be configured to carry out the operations described at 108, 126, 128 and 130, the stripper may be configured to carry out the operations described at 112 and 124 and the extractor 42 may be configured to carry out the operations at 110, 114, 115, 116, 118, 120 and 122.

Technical effects of the herein described systems and methods include determining whether the content entering a node is self-validating. Other technical effects include determining whether the content comprises an adjunct and, if so, whether the adjunct comprises metadata and/or a watermark.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A method of validating a content for use on a network comprising a plurality of nodes configured to communicate a content validity status therebetween, comprising:
   receiving the content at a node of the network;
   identifying whether the content is embedded with at least one adjunct;
   determining whether the at least one adjunct comprises a watermark and whether the at least one adjunct comprises meta data;
   reviewing each of the watermark and the meta data, where found, to determine whether the content is valid for use on the node;
   indicating that the content is unauthorized for use on the node where content is not embedded with an adjunct or where a watermark and/or meta data, where found, is not able to render the content valid for use the node; and
   after identifying whether the content is embedded with at least one adjunct, signaling to all other available or connected nodes on the network that the content is unauthorized for use on any node of the network where the content is unauthorized for use on the node and preventing transfer of the content to the other nodes by signaling to the other nodes that the content is unauthorized.

2. The method of claim 1, wherein determining whether the adjunct comprises meta data comprising determining whether there is information embedded in the content.

3. The method of claim 2, wherein determining whether there is information embedded in the content comprises determining whether the content comprises a digital rights management wrapper.

4. The method of claim 2, wherein determining whether the adjunct comprises a watermark comprises determining whether the adjunct comprises at least one of a video watermark and an audio watermark.

5. The method of claim 2, wherein reviewing each of the watermark and the meta data, where found, to determine whether the content is valid comprises identifying whether the watermark and/or meta data provides a source of the content.

6. The method of claim 2, wherein reviewing each of the watermark and the meta data, where found, to determine whether the content is valid comprises identifying whether the watermark and/or meta data provides restrictions on use on the node.

7. The method of claim 2, wherein reviewing each of the watermark and the meta data, where found, to determine whether the content is valid comprises identifying whether the watermark and/or meta data provides rights associated with the content that allows use on the node.

8. The method of claim 2, wherein the at least one adjunct comprises a plurality of adjuncts and wherein reviewing each of the watermark and the meta data, where found, to determine whether the content is valid comprises:
   identifying whether the watermark and/or meta data provides rights associated with the content; and
   identifying whether the watermark and/or meta data provides a restriction on use of the content.

9. The method of claim 2, wherein reviewing each of the watermark and the meta data, where found, to determine whether the content is valid comprises identifying whether the watermark and/or meta data grants any transfer rights and identifying whether the watermark and/or meta data provides at least one prior transferor and comparing the transfer rights with the prior transferor to determine if the content was validly transferred.

10. The method of claim 2, wherein reviewing each of the watermark and the meta data, where found, to determine whether the content is valid comprises identifying at least one of whether the watermark and/or meta data provides rights associated with the content and whether the watermark and/or meta data provides a restriction on use of the content; and
   further comprising identifying whether the watermark and/or meta data provides a prior location the content was transferred from and comparing the rights associated with the content or the restriction on use of the content with the prior location to determine if it was transferred according to the rights or restrictions.

11. The method of claim 1, further comprising indicating that the content is authorized where found to be valid.

12. The method of claim 1, wherein the content comprises digital data.

13. The method of claim 1, wherein the watermark comprises a visible watermark.

14. A circuit for validating a content entering a network comprising a plurality of nodes configured to communicate a content validity status therebetween, comprising:
   a display;
   a memory;
   means for receiving the content at a node of the network;
   means for identifying whether the content is embedded with at least one adjunct and where found, whether the adjunct comprises a watermark and whether the content comprises meta data;
   means for indicating that the content is unauthorized for use on the node where the content is not embedded with at least one adjunct, or where either a watermark or meta data is found that is not able to render the content valid for use on the node, the indicating means and the identifying means being interconnected with the display and the memory; and
   means for signaling to all other available or connected nodes in the network, if the content is not embedded with at least one adjunct or where the watermark or meta data is found but is not able to render the content valid for use on the node, that the content is unauthorized for use on any node in the network and preventing transfer of the content to other nodes by signaling to the other nodes that the content is unauthorized.

15. The circuit of claim 14, wherein the identifying and indicating means comprises a processor interconnected with the display.

16. The circuit of claim 15, wherein the identifying and indicating means further comprises a stripper communicating with the processor, the stripper being configured to identify meta data in the content and then the strip meta data from the content for communication to the processor.

17. The circuit of claim 16, wherein the identifying and indicating means further comprises an extractor communicating with the processor, the extractor being configured to identify embedded information in the content and then extract the embedded information in the content for communication to the processor.

* * * * *